United States Patent
Konrad et al.

(10) Patent No.: US 6,176,079 B1
(45) Date of Patent: Jan. 23, 2001

(54) PROCESS AND APPARATUS FOR REDUCING NITROGEN-OXIDE EMISSIONS IN EXHAUST GAS

(75) Inventors: Brigitte Konrad, Blaustein; Bernd Krutzsch, Denkendorf; Dirk Voigtlaender, Korntal-Muenchingen, all of (DE)

(73) Assignee: DaimlerChrysler AG, Stuttgart (DE)

( * ) Notice: Under 35 U.S.C. 154(b), the term of this patent shall be extended for 0 days.

(21) Appl. No.: 09/307,731

(22) Filed: May 10, 1999

(30) Foreign Application Priority Data

May 9, 1998 (DE) .............................. 198 20 828

(51) Int. Cl.$^7$ ....................................... F01N 3/00
(52) U.S. Cl. ................ 60/274; 60/297; 60/301; 423/237; 423/234; 423/239.1
(58) Field of Search ............................. 60/274, 297, 299, 60/301, 295; 423/237, 234, 239.1, 213.2, 213.5

(56) References Cited

U.S. PATENT DOCUMENTS

| | | | |
|---|---|---|---|
| 5,611,198 | * 3/1997 | Lane et al. | 60/299 |
| 5,782,087 | * 7/1998 | Kinugasa et al. | 60/276 |
| 5,783,160 | * 7/1998 | Kinugasa et al. | 423/237 |
| 5,974,793 | * 11/1999 | Kinugasa et al. | 60/285 |
| 6,047,542 | * 4/2000 | Kinugasa et al. | 60/274 |

FOREIGN PATENT DOCUMENTS

| | | |
|---|---|---|
| 0 773 354 A1 | 5/1997 | (EP) . |
| WO 97/17532 | 5/1997 | (WO) . |
| WO 97/19262 | 5/1997 | (WO) . |

* cited by examiner

Primary Examiner—Thomas Denion
Assistant Examiner—Binh Tran
(74) Attorney, Agent, or Firm—Evenson, McKeown, Edwards & Lenahan, P.L.L.C.

(57) ABSTRACT

A method of cleaning an exhaust gas from a combustion system that is operated alternately in lean and rich conditions includes intermediately storing nitrogen oxides during lean operation; releasing the stored nitrogen oxides, thereby producing ammonia and storing the ammonia during rich operation; releasing the ammonia, thereby reducing nitrogen oxides in a subsequent lean condition.

6 Claims, 1 Drawing Sheet

PROCESS AND APPARATUS FOR REDUCING NITROGEN-OXIDE EMISSIONS IN EXHAUST GAS

BACKGROUND AND SUMMARY OF THE INVENTION

This application claims the priority of German Patent Application No. 198 20 828.6, filed May 9, 1998, the disclosure of which is expressly incorporated by reference herein.

The present invention relates to an exhaust gas cleaning system, having (1) a first catalyst unit which, in the case of a rich exhaust gas composition, generates ammonia from corresponding exhaust gas constituents; and (2) a second catalyst unit connected behind the first which, in the case of a rich exhaust gas composition, intermediately stores ammonia generated by the first catalyst unit. In the case of a lean exhaust gas composition, the second catalyst unit subjects nitrogen oxides ($NO_x$) contained in the exhaust gas to a reducing reaction using the intermediately stored ammonia as a reducing agent.

The term "rich exhaust gas composition" relates to the composition of the exhaust gas that is obtained during rich operation (with a fuel fraction above the stoichiometric ratio) of the combustion process. The term "lean exhaust gas composition" relates to the composition of the exhaust gas that is obtained during lean operation (with a fuel fraction below the stoichiometric ratio) of the combustion process. Such an exhaust gas cleaning system can be used, for example, for a motor vehicle engine in order to minimize its nitrogen oxide emissions.

For achieving low nitrogen oxide emissions in motor vehicle combustion engines, for example, it is known to drive the engine alternately in rich and in lean engine operation and to provide an exhaust gas cleaning system having one or several parallel nitrogen-oxide adsorber catalysts. The nitrogen-oxide adsorber catalysts adsorb nitrogen oxides in lean engine operating phases and desorb them in rich engine operating phases, thereby reducing them by means of exhaust gas recirculation or another technique.

Furthermore, exhaust gas cleaning systems are known in which a nitrogen oxide reducing agent is added from the outside in order to reduce nitrogen oxides contained in the fed exhaust gas to nitrogen.

An exhaust gas cleaning system of the initially mentioned type is described in European Published Patent Application EP 0 15 773 354 A1 for cleaning the exhaust gas of an internal-combustion engine. The ammonia-generating catalyst unit is a three-way catalyst which, during a rich engine operation, synthesizes ammonia from nitrogen oxides and hydrogen which are contained in the exhaust gas. The generated ammonia is adsorbed in the second catalyst unit connected behind the first and is intermediately stored. In the intervals with the lean internal-combustion engine operation, the three-way catalyst lets the nitrogen oxides contained in the exhaust gas pass to the second catalyst unit connected on the output side, where the ammonia is then released and is used as a reducing agent for reducing the nitrogen oxides. The nitrogen oxides are converted to nitrogen with simultaneous oxidation of the ammonia. The two catalyst units contain suitable catalyst materials for fulfilling the above-mentioned functions: for example, palladium (Pd) or cerium (Ce) for the three-way catalyst, and a zeolite, silicon oxide, aluminum oxide and/or titanium oxide material with copper (Cu), iron (Fe), platinum (Pt), palladium (Pd) and/or rhodium (Rh) for the ammonia-adsorbing and oxidizing catalyst unit. As soon as the intermediately stored ammonia quantity is exhausted in the lean operation, a switch-over takes place to a rich internalcombustion engine operation.

One difficulty of this system is that, in the rich operation, significantly fewer nitrogen oxides are contained in the exhaust gas and therefore a correspondingly low amount of ammonia is produced. The rich operation, which is unfavorable with respect to the fuel consumption, must be maintained for a relatively long time in order to obtain a defined significant amount of ammonia.

The present invention is based on the technical problem of providing an exhaust gas purification system by means of which the nitrogen oxide content of combustion exhaust gases, such as motor vehicle engine emissions, can be reduced effectively and at comparatively low expenditures and the corresponding combustion process can be carried out with lean-operation which is as high as possible.

The present invention solves this problem by providing an exhaust gas cleaning system having the following characteristics.

A first catalyst unit is connected in front of a second catalyst unit. The second catalyst unit, in the case of a rich exhaust gas composition, produces ammonia from corresponding exhaust gas constituents. In a lean exhaust gas composition, the first catalyst unit intermediately adsorbs and stores the nitrogen oxides contained in the lean exhaust gas and desorbs them in a rich exhaust gas composition. The first catalyst unit can be formed, for example, by a conventional nitrogen-oxide adsorber catalyst. In the case of a lean exhaust gas composition (in the lean operation of a corresponding internal-combustion process in which more nitrogen oxides occur than in a rich internal-combustion process), a comparatively large amount of nitrogen oxide can be intermediately stored in the first catalyst unit.

When the first catalyst unit is saturated with intermediately stored nitrogen oxides, during a further lean operation, the nitrogen oxides contained in the exhaust gas flow through the ammonia-producing catalyst unit, which essentially remains passive in the lean operation, to a third catalyst unit which intermediately stores ammonia. In the third catalyst unit the nitrogen oxides are reduced to nitrogen while the intermediately stored ammonia is released and acts as a reducing agent. In the case of a rich exhaust gas composition (an internal-combustion process carried out by means of an overstoichiometric fuel-rich mixture), the nitrogen oxides intermediately stored during the preceding lean operation in the upstream first catalyst unit are released and are used in the second catalyst unit for the production of ammonia which is then intermediately stored in the downstream third catalyst unit.

By using the intermediately stored nitrogen oxides, which, in the lean operation occur in much larger quantities than in the rich operation, a correspondingly large amount of ammonia is produced and intermediately stored in a rich combustion process. The stored ammonia is then available for the effective nitrogen oxide reduction in a subsequent lean operating phase. On the whole, this permits an operation with a high lean-operation part and therefore with a correspondingly low fuel consumption.

Other objects, advantages and novel features of the present invention will become apparent from the following detailed description of the invention when considered in conjunction with the accompanying drawings.

DETAILED DESCRIPTION OF THE DRAWINGS

Figure 1:
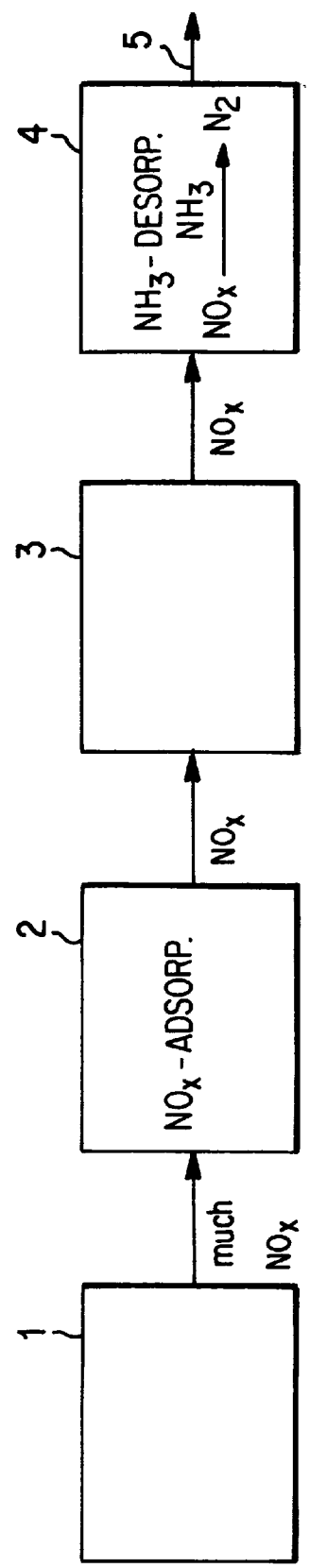
FIG. 1 is a schematic block diagram of an internal-combustion engine with an exhaust gas cleaning system in a lean operating phase.

The figures schematically illustrate an internal-combustion engine 1, such as a motor vehicle engine, in whose exhaust gas system an exhaust gas cleaning system is inserted. The exhaust gas cleaning system comprises three serially connected catalyst units 2, 3, 4, as illustrated. Viewed in the flow direction indicated by the arrows, the three catalyst units are a nitrogen oxide adsorption catalyst 2, an ammonia-producing catalyst 3 connected behind the nitrogen oxide adsorption catalyst 2, and an ammonia adsorption catalyst 4 which follows. The three catalyst units 2, 3, 4 are of a conventional construction and contain a catalyst material which is suitable for the respective function to be carried out, which is known per se from the above-mentioned prior art and does not have to be explained here in detail. A platinum catalyst material, for example, can be used for the ammonia-producing catalyst unit 3.

The catalyst unit 4, which is used for the ammonia adsorption in the rich engine operation and for the ammonia desorption and nitrogen oxide reduction in the lean engine operation, may be formed, for example, by a conventional so-called SCR (selective catalytic reduction) catalyst. The nitrogen oxides are subjected to a selective catalytic reducing reaction in which ammonia acts as a reducing agent. Such a conventional SCR-catalyst has a sufficient intermediate ammonia storage capability. The various functions of the three catalyst units 2, 3, 4 with a lean-operated engine 1, on the one hand, and with a rich-operated engine 1, on the other hand, will be discussed in detail.

FIG. 1 illustrates the situation during a lean operating phase, in which the engine 1 is operated with an understoichiometric fuel fraction (rich in oxygen). The resulting lean exhaust gas composition contains a comparatively high amount of nitrogen oxides. The nitrogen-oxide-rich gas arrives in the nitrogen oxide adsorber catalyst 2 which adsorbs and therefore intermediately stores a significant amount of nitrogen oxides. To the extent that the nitrogen oxides are not adsorbed by this catalyst 2, particularly when its nitrogen oxide storage capacity is reached, the nitrogen oxides will continue to move with the exhaust gas through the ammonia-producing catalyst 3, which remains passive in this lean operating phase, to the subsequent catalyst unit 4. In this catalyst unit 4, ammonia, which had been adsorbed and therefore intermediately stored in a preceding rich engine operating phase, is desorbed and acts as a reducing agent, by means of which the nitrogen oxides contained in the exhaust gas are reduced to nitrogen. During this reaction, the ammonia is simultaneously oxidized. The exhaust gas 5 flowing out of catalyst unit 4 is therefore largely free of nitrogen oxides.

Figure 2:
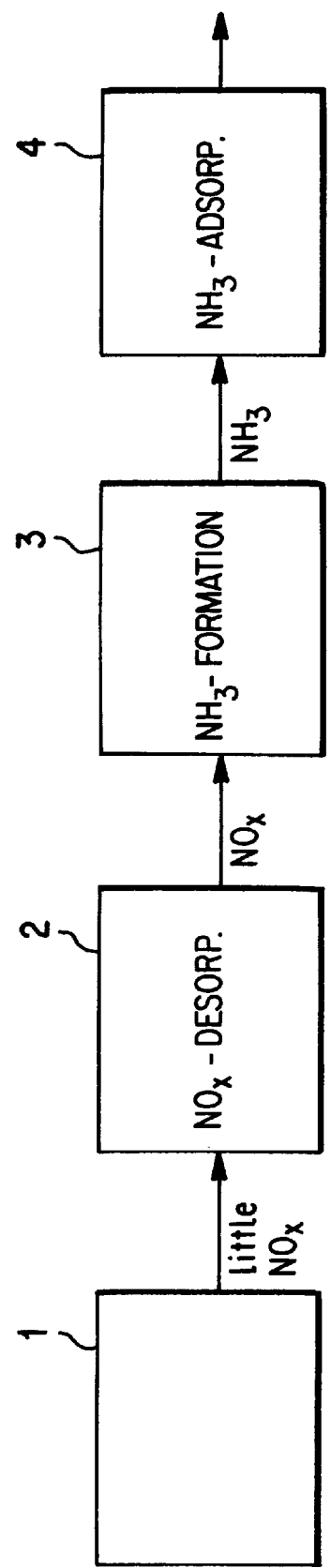
FIG. 2 is a view of an engine with an exhaust gas cleaning system of FIG. 1 in a rich engine operating phase.

FIG. 2 illustrates the situation during a rich operating phase (operation with an overstoichiometric fuel fraction). In this method of operation, a much lower nitrogen oxide fraction occurs in the engine exhaust gas than in the lean operation. During the rich engine operating phase, the nitrogen oxide adsorption catalyst 2 works in the desorption operation and therefore releases the nitrogen oxides which were intermediately stored in it during a preceding lean operating phase. Together with the low-nitrogen-oxide exhaust gas flow, the desorbed nitrogen oxides arrive in the ammonia-producing catalyst unit 3 which follows. During the rich engine operation, the ammonia-producing catalyst unit 3 synthesizes ammonia from constituents which are contained in the fed exhaust gas, particularly utilizing the nitrogen oxides and hydrogen which is present in the rich exhaust gas composition. Since, for this ammonia production, not only the nitrogen oxides emitted by the engine 1 in this rich operating phase are used, but also the nitrogen oxides intermediately stored during the preceding lean operation in the nitrogen oxide adsorption catalyst 2, a correspondingly large amount of ammonia can be obtained which is then intermediately stored by adsorption in the catalyst unit 4 and is therefore available for a next lean operating phase as a reducing agent for the nitrogen oxide reduction.

It is understood that, according to requirements, additional exhaust gas cleaning functions of a conventional type may be provided in one or several of the three illustrated catalyst units 2, 3, 4 or in additional exhaust gas cleaning components which may be arranged upstream, downstream and/or between the three illustrated catalyst units 2, 3, 4. It is also understood that the storage capacities of the nitrogen oxide adsorber catalyst 2 and of the ammonia adsorption catalyst 4 are appropriately coordinated with one another in order to ensure that essentially all ammonia formed during a rich engine operating phase in the respective catalyst unit while using the intermediately stored nitrogen oxides can be intermediately stored by the ammonia adsorption catalyst.

The above description demonstrates that, if the engine 1 is run alternately with rich and lean operating phases, it can be operated with a continuously low nitrogen oxide emission with high lean operation because of the exhaust gas cleaning system. The reason is that the rich engine operation must be maintained only until the nitrogen oxides previously intermediately stored in the nitrogen oxide adsorption catalyst 2 are freed and a corresponding amount of ammonia is formed using these nitrogen oxides in catalyst unit 3 which follows. The time period required for this purpose is considerably shorter than the time period required for producing the same amount of ammonia without the use of the nitrogen oxide adsorption catalyst 2, because the nitrogen oxide adsorber catalyst 2 can provide a certain amount of nitrogen oxide much faster than the rich-operated engine 1. It should also be stressed that, in the case of the exhaust gas cleaning system according to the present invention, an external feeding of a nitrogen oxide reducing agent, for example, by an external injection of ammonia into the exhaust gas system, is not absolutely necessary but may be considered as an additional supporting measure.

The above description of an advantageous embodiment therefore shows that the exhaust gas cleaning system according to the present invention permits an optimal fuel-consumption operation of a combustion system, such as an internal-combustion engine or a heating system, in which the nitrogen oxide emission is simultaneously low.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An exhaust gas cleaning system, comprising three serially connected catalysts:
   a first catalyst that stores nitrogen oxide in a lean combustion operation and desorbs the nitrogen oxides in a rich combustion operation;
   a second catalyst connected behind the first catalyst that produces ammonia in the rich combustion operation; and a third catalyst connected behind the second catalyst that stores the ammonia in the rich combustion operation and desorbs the ammonia in the lean combustion operation.

2. A method of cleaning an exhaust gas from a combustion system, comprising:

alternately operating said combustion system in a lean condition and in a rich condition, thereby generating exhaust gas;

passing said exhaust gas through a first catalyst that stores nitrogen oxide in a lean combustion operation and releases the nitrogen oxides in a rich combustion operation;

further passing said exhaust gas through a second catalyst that produces ammonia in the rich combustion operation; and further passing said exhaust gas through a third catalyst that stores the ammonia in the rich combustion operation and releases the ammonia in the lean combustion operation.

3. A method of cleaning an exhaust gas from a combustion system that operates in rich and in lean conditions, comprising:

a) operating the combustion system in a rich condition, thereby producing a rich exhaust gas composition comprising nitrogen oxides and hydrogen;

b) directing the rich exhaust gas composition through a first catalyst unit to a second catalyst unit which produces ammonia;

c) directing the rich exhaust gas composition and ammonia to a third catalyst unit which stores the ammonia;

d) switching the combustion system to a lean condition, thereby producing a lean exhaust gas composition comprising nitrogen oxides;

e) directing the lean exhaust gas composition to the first catalyst unit which stores a first portion of the nitrogen oxides;

f) directing the lean exhaust composition with a remaining second portion of nitrogen oxides through the second catalyst unit to the third catalyst unit which releases the ammonia and reduces the remaining second portion of nitrogen oxides using the ammonia as a reducing agent; and repeating steps a) through f).

4. The method according to claim 3, further comprising releasing stored nitrogen oxides in the first catalyst unit from a previous lean operation during the directing of the rich exhaust gas composition through the first catalyst unit to a second catalyst unit.

5. A method according to claim 3, wherein said combustion system is an internal-combustion engine.

6. A method according to claim 3, wherein said combustion system is a heating system.

* * * * *